(12) United States Patent
Ohishi et al.

(10) Patent No.: US 8,847,827 B2
(45) Date of Patent: Sep. 30, 2014

(54) COMMUNICATION APPARATUS

(75) Inventors: Takafumi Ohishi, Yokohama (JP); Noriaki Oodachi, Kawasaki (JP); Shuichi Obayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 465 days.

(21) Appl. No.: 13/361,011

(22) Filed: Jan. 30, 2012

(65) Prior Publication Data

US 2012/0127042 A1    May 24, 2012

Related U.S. Application Data

(63) Continuation of application No. PCT/JP2009/004773, filed on Sep. 18, 2009.

(51) Int. Cl.
*H01Q 1/24* (2006.01)
*H01Q 1/52* (2006.01)
*H04B 13/00* (2006.01)
*H01Q 1/27* (2006.01)
*H01Q 21/28* (2006.01)

(52) U.S. Cl.
CPC ............... *H01Q 1/243* (2013.01); *H01Q 1/521* (2013.01); *H04B 13/005* (2013.01); *H01Q 1/273* (2013.01); *H01Q 21/28* (2013.01)
USPC ........................................................ 343/702

(58) Field of Classification Search
None
See application file for complete search history.

(56) References Cited

U.S. PATENT DOCUMENTS

| | | | |
|---|---|---|---|
| 7,139,529 B2 | 11/2006 | Rekimoto et al. | |
| 7,433,651 B2 | 10/2008 | Rekimoto et al. | |
| 7,557,762 B2 | 7/2009 | Shimasaki et al. | |
| 7,884,770 B2 * | 2/2011 | Yanagi et al. | 343/702 |
| 2004/0024884 A1 | 2/2004 | Rekimoto et al. | |
| 2006/0194541 A1 | 8/2006 | Rekimoto et al. | |
| 2008/0143613 A1 | 6/2008 | Iwai et al. | |
| 2008/0198075 A1 * | 8/2008 | Yoshioka | 343/700 MS |
| 2009/0036054 A1 | 2/2009 | Rekimoto et al. | |
| 2010/0069017 A1 * | 3/2010 | Yamamoto et al. | 455/68 |

FOREIGN PATENT DOCUMENTS

| | | |
|---|---|---|
| CN | 1398471 | 2/2003 |
| CN | 1254049 | 4/2006 |
| CN | 101304109 | 11/2008 |
| EP | 1237333 | 9/2002 |
| JP | 7-202774 | 8/1995 |
| JP | 2002-204239 | 7/2002 |

(Continued)

OTHER PUBLICATIONS

International Search Report for PCT/JP209/004773 mailed Dec. 15, 2009.

(Continued)

*Primary Examiner* — Trinh Dinh
(74) *Attorney, Agent, or Firm* — Nixon & Vanderhye, P.C.

(57) ABSTRACT

In one embodiment, a communication apparatus includes a substrate, an antenna disposed on the substrate, a first communication part transmitting or receiving a signal at a predetermined frequency via the antenna, a first conductor plate, a terminal disposed on the substrate and connected to the first conductor plate by a conductor line, a second communication part disposed on the substrate, connected electrically to the terminal, and communicating with a communication partner via the first conductor plate, and a second conductor plate connected electrically to the conductor line and having a length of substantially ¼ of the wavelength of the predetermined frequency.

10 Claims, 8 Drawing Sheets

(56) References Cited

FOREIGN PATENT DOCUMENTS

| | | |
|---|---|---|
| JP | 2003-37566 | 2/2003 |
| JP | 2005-4383 | 1/2005 |
| JP | 2008-167421 | 7/2008 |
| JP | 2008-205604 | 9/2008 |
| JP | 2008-283464 | 11/2008 |
| JP | 2008-300897 | 12/2008 |
| JP | 2009-65666 | 3/2009 |
| WO | WO 02/35773 | 5/2002 |

OTHER PUBLICATIONS

English-language machine translation of JP 7-202774, 6 pages, Jan. 19, 2012.

English-language machine translation of JP 2005-004383, 63 pages; Jan. 18, 2012.

English-language machine translation of JP 2008-205604, 8 pages, Jan. 19, 2012.

English-language machine translation of JP 2003-037566, 25 pages, Jan. 30, 2012.

English-language machine translation of JP 2008-300897, 27 pages, Jan. 30, 2012.

English-language translation of International Preliminary Report on Patentability, 5 pages, Apr. 11, 2012.

Office Action dated Mar. 19, 2013 in JP Application No. 2011-531664 with English-language translation.

\* cited by examiner

COMMUNICATION APPARATUS

CROSS-REFERENCE TO RELATED APPLICATIONS

This application is a continuation of prior International Application No. PCT/JP2009/004773 filed on Sep. 18, 2009; the entire contents of all of which are incorporated herein by reference.

FIELD

Embodiments described herein relate to a communication apparatus.

BACKGROUND

There is a communication system for communication between apparatuses via a human body serving as a transmission channel. In this communication system, a pair of electrodes is disposed in an apparatus. One is a signal electrode for transmitting/receiving a signal, and the other is a reference electrode for transmitting a reference potential. Signal electrodes are coupled to each other mainly through human bodies, whereas reference electrodes are coupled to each other mainly through a space and/or the earth ground. With these couplings, the communication apparatus transfers a potential difference between the signal electrode and the reference electrode to the correspondent communication apparatus.

In the above-described communication system, it is preferred that the areas of electrodes be large in order to stabilize coupling between apparatuses. Further, the potential difference becomes small when short circuit between the signal electrode and the reference electrode occurs in the apparatus, and thus the pair of electrodes needs to be spaced apart in the apparatus. Accordingly, when a small radio terminal such as a mobile telephone is made operable as an apparatus for the aforementioned communication system, it is preferred that the pair of electrodes be disposed at both ends of a small radio terminal.

However, an antenna is often disposed in an end portion of a small radio terminal, and it is highly possible that the antenna and an electrode are disposed in the same end portion. Consequently, it is possible that the electrode deteriorates the performance of the antenna.

DETAILED DESCRIPTION

In one embodiment, a communication apparatus includes a substrate, an antenna disposed on the substrate, a first communication part transmitting or receiving a signal at a predetermined frequency via the antenna, a first conductor plate, a terminal disposed on the substrate and connected to the first conductor plate by a conductor line, a second communication part disposed on the substrate, connected electrically to the terminal, and communicating with a communication partner via the first conductor plate, and a second conductor plate connected electrically to the conductor line and having a length of substantially ¼ of the wavelength of the predetermined frequency.

Hereinafter, the present embodiments will be described in detail with reference to the drawings.

First Embodiment

Figure 1:
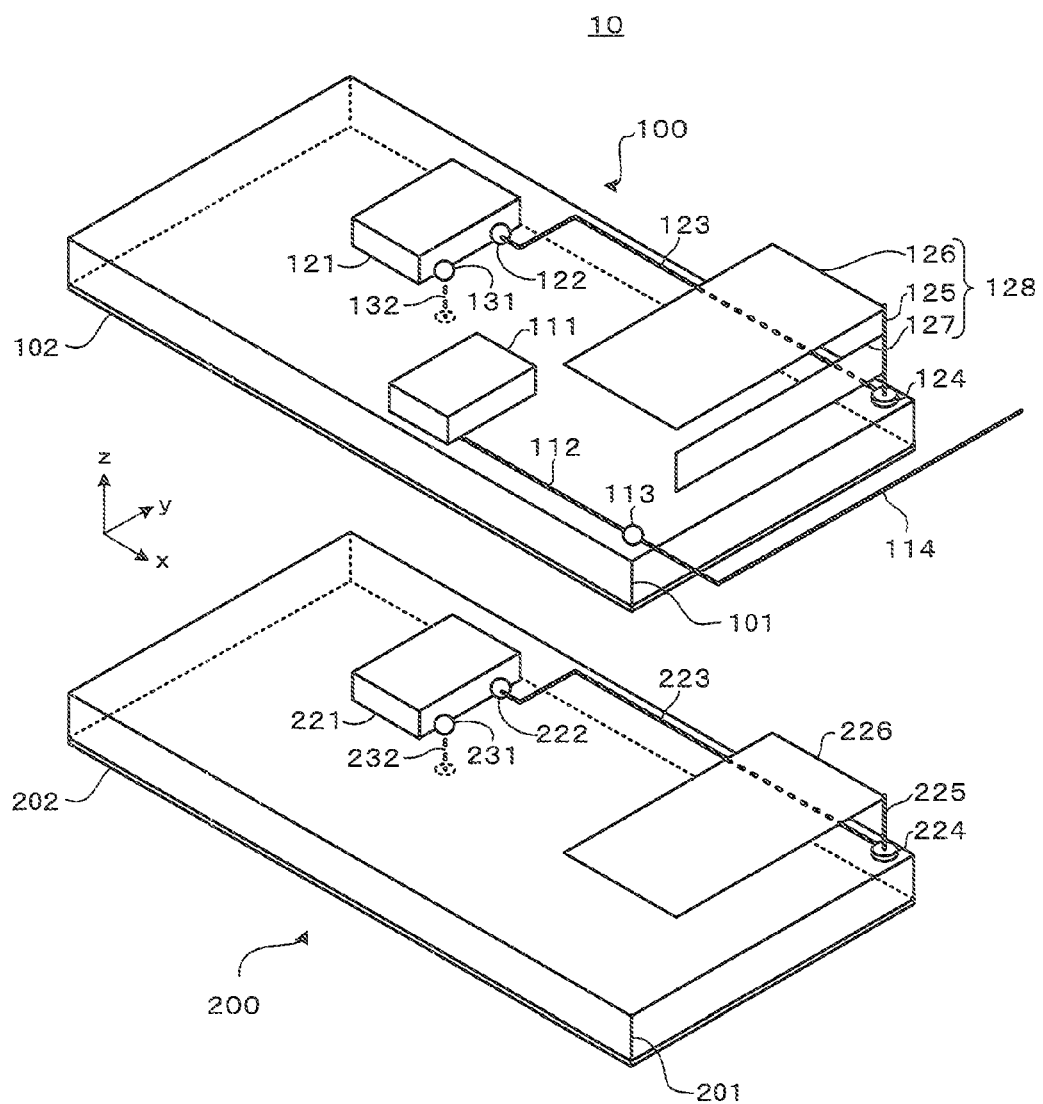
FIG. 1 is a schematic view representing a communication system 10 according to a first embodiment of the present invention.

FIG. 1 is a schematic view representing a communication system 10 according to a first embodiment. The communication system 10 has communication apparatuses 100, 200. The communication apparatuses 100, 200 communicate via a human body serving as a communication path. Further, the communication apparatus 100 is capable of performing radio communication with an external apparatus other than the communication apparatus 200, and is incorporated in, for example, a mobile radio apparatus to communicate with a base station.

The communication apparatus 100 has a substrate 101, a ground part 102, a communication part 111, a signal line 112, a power supply part 113, an antenna 114, a communication part 121, a terminal 122, a signal line 123, a terminal 124, a signal line 125, a conductor plate 126, a conductor plate 127, a terminal 131, and a through hole 132.

The substrate 101 is formed of an insulating material (organic material (resin or the like)) and a composite material (composite material of glass fiber and resin or the like)). Further, the substrate 101 may either be of a single layer or multi-layers. That is, the substrate 101 may be formed of a multi-layer substrate in which plural substrates are layered. In this case, a conductor layer is disposed between plural substrates.

The ground part 102 is disposed on a lower face of the substrate 101 and is a conductor having a reference potential, for example a metal layer.

The communication part 111 is disposed on an upper face of the substrate 101, and performs radio communication with the external apparatus by radio waves via the antenna 114. The signal line 112 is mounted on the substrate 101 and connects the power supply part 113 and the communication part 111. The power supply part 113 is disposed on the upper face of the substrate 101 and supplies power to the antenna 114. The antenna 114 is connected to the power supply part 113 and transmits a radio signal to the external apparatus. Alternatively, the antenna 114 may operate as a reception antenna receiving a radio signal from the external apparatus. Further, the antenna 114 may be a transmission/reception antenna capable of transmitting/receiving a radio signal.

The communication part 121 is mounted on the substrate 101 and communicates with the communication apparatus 200. That is, the communication part 121 has a transmission part transmitting a signal to the communication apparatus 200 and a reception part receiving a signal from the communication apparatus 200, and is capable of switching which of them is connected to the terminal 122.

The terminals 122, 131 are mounted on the communication part 121, and are an input/output signal terminal and a reference potential terminal, respectively, of the communication part 121.

The terminal 122 is an input/output signal terminal mounted on the communication part 121 and is connected to the signal line 123. The signal line 123 is mounted on the substrate and is connected at both ends to the terminal 124 and the terminal 122. The terminal 124 is mounted on the substrate.

The signal line 125 connects the terminal 124 and the conductor plate 126. The signal line 125 is a conductor line formed of a conductive element. The conductor plate 126 is connected to an end portion of the signal line 125. The conductor plate 127 is connected onto the signal line 125 between the terminal 124 and the conductor plate 126. The conductor plates 126, 127 in their entireties form an electrode 128.

The terminal 131 is a reference potential terminal mounted on the communication part 121 and is connected to the ground part 102 via the through hole 132.

The communication apparatus 200 has a substrate 201, a ground part 202, a communication part 221, a terminal 222, a signal line 223, a terminal 224, a signal line 225, a conductor plate 226, a terminal 231, and a through hole 232. These substrate 201 and so on correspond to the substrate 101, the ground part 102, the communication part 121, the terminal 122, the signal line 123, the terminal 124, the signal line 125, the conductor plate 126, the terminal 131, and the through hole 132 of the communication apparatus 100, and thus the detailed descriptions thereof are omitted.

(Operation of the Communication System 10)

One or both of the conductor plates 126, 127 of the communication apparatus 100 electrostatically couple to the surface of a human body. The conductor plate 226 of the communication apparatus 200 electrostatically couples to the surface of the same human body. That is, the conductor plates 126, 127 of the communication apparatus 100 and the conductor plate 226 of the communication apparatus 200 electrostatically couple to each other via the human body.

On the other hand, the ground part 102 of the communication apparatus 100 and the ground part 202 of the communication apparatus 200 electrostatically couple to each other via space.

Consequently, a signal (potential difference) emitted by the communication part 121 can be detected by the communication part 221 of the communication apparatus 200. Conversely, a signal (potential difference) emitted by the communication part 221 of the communication apparatus 200 can be detected by the communication part 121.

In order to electrostatically couple to the human body surface, the conductor plates 126 and 127 need a certain size of an area. When the conductor plates 126 and 127 are connected onto the substrate 101, an electric current leaking from the power supply part 113 to the substrate 101 flows to the conductor plates 127 and 126 via the signal line 125 from the terminal 124 and deteriorates characteristics of the antenna 114.

There exist approaches to improve characteristics of the antenna by suppressing the electric current leaking from the power supply part 113 and flowing on the substrate 101. For example, there is an approach to add a cut or a choke element to the substrate. Further, there is an approach to add a choke element with a ¼ wavelength to an external conductor of a sleeve antenna. In these approaches, the choke element or the like is added to a position different from a radiating element portion of the antenna, and the choke element or the like does not contribute to radiation in the antenna.

Here, the length of the conductor plate 127 on the signal line 125 is substantially ¼ of the wavelength of the operating frequency of the antenna 114, and the conductor plate 127 is made to operate as a choke stub. Thus, the electric current leaking from the power supply part 113 to the substrate 101 and flows to the conductor plate 126 via the terminal 124 and the signal line 125 is suppressed. Further, the conductor plate 127 can also function as an electrode.

Figure 2:
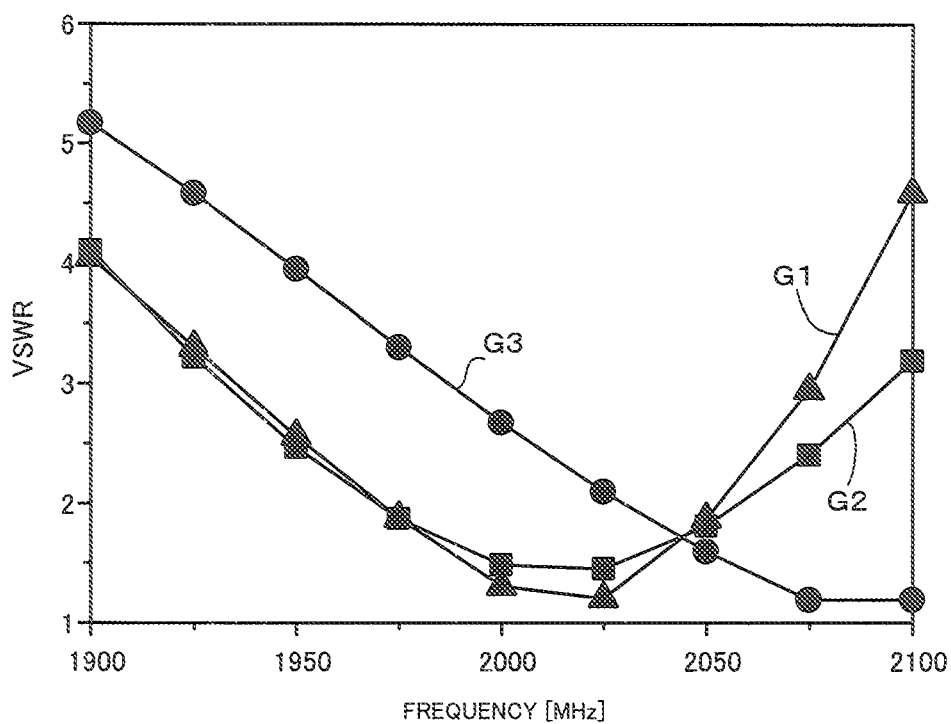
FIG. 2 is a graph illustrating frequency characteristics of reflection characteristics VSWR when power is supplied to an antenna.
Figure 3:
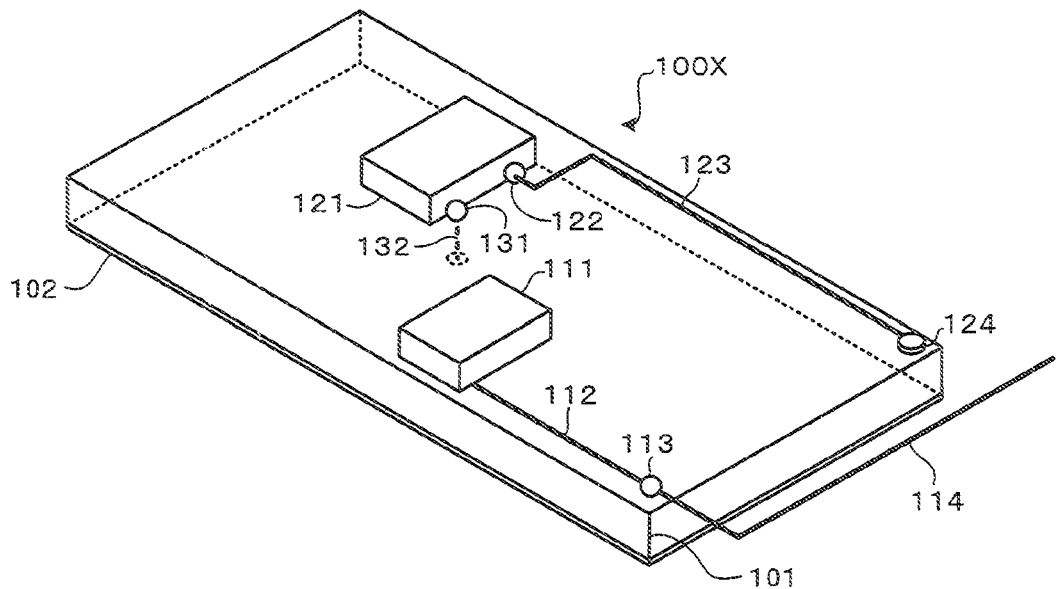
FIG. 3 is a schematic view representing a communication apparatus according to comparative example 1.
Figure 4:
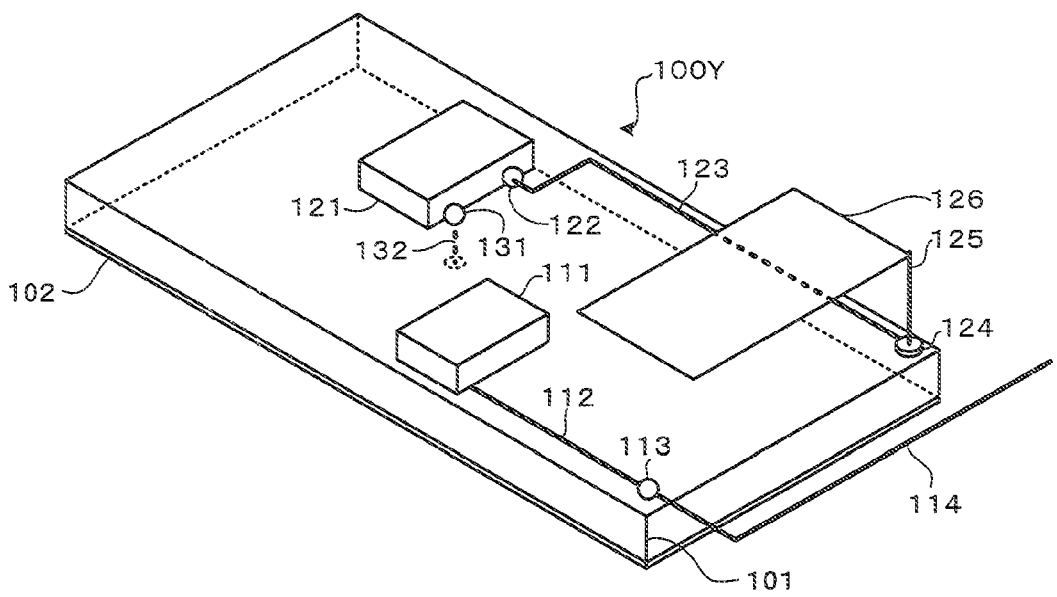
FIG. 4 is a schematic view representing a communication apparatus according to comparative example 2.

FIG. 2 is a graph illustrating frequency characteristics of reflection characteristics VSWR (Voltage Standing Wave Ratio) when power is supplied to the antenna 114. In addition to a characteristic (graph G1) of the communication apparatus 100 according to this embodiment, FIG. 2 represents characteristics (graphs G2, G3) of communication apparatuses 100X, 100Y according to comparative examples 1, 2. FIG. 3 and FIG. 4 represent the communication apparatuses 100X, 100Y, respectively.

As illustrated in FIG. 3, the communication apparatus 100X according to comparative example 1 does not have the signal line 125 and both the conductor plates 126, 127. As illustrated in FIG. 4, the communication apparatus 100Y according to comparative example 2 does not have the conductor plate 127 (the conductor plate 126 is added).

The VSWR characteristic of the antenna 114 of comparative example 1 (communication apparatus 100X) is 2 or lower at the operating frequency (1975 MHz to 2050 MHz). In comparative example 2 (communication apparatus 100Y), the conductor plate 126 is added and the frequency characteristic of the antenna 114 changes. By the frequency characteristics shifted in this manner, communication characteristics of the communication part 111 and the external apparatus deteriorate. In the embodiment (communication apparatus 100), the conductor plate 127 having a ¼ length of the wavelength of the operating frequency of the antenna 114 is connected. Consequently, the frequency range in which the VSWR of the antenna 114 becomes 2 or lower is substantially similar to that of comparative example 1. That is, the embodiment having the conductor plates 126, 127 is substantially the same as comparative example 1 not having the conductor plates 126, 127 in operating frequency range of the antenna 114, that is, communication characteristics in the communication part 111.

Thus, the conductor plate 127 suppresses the leakage current flowing from the substrate 101 to the conductor plate 126 via the signal line 125. In addition, the conductor plate 127 plays the role of an electrode. When the communication part 121 communicates with the communication apparatus 200, the conductor plates 126, 127 electrostatically couple to the electrode 226 of the communication apparatus 200. At this point, the conductor plates 126 and 127 are connected in parallel, and thus the area of the electrode 128 increases, which intensifies the coupling between the communication apparatuses 100, 200.

In FIG. 1, the conductor plate 127 is disposed on a different face from the conductor plate 126. The face of the electrode 128 that electrostatically couples to the electrode 226 of the communication apparatus 200 increases, and thus the communication part 121 can attain diversity performance.

Note that although the operating frequency range of the antenna 114 in this embodiment is 1975 MHz to 2050 MHz, it is not limited to this frequency range. The operating frequency of the antenna 114 changes according to the frequency used in the communication part 111, and the conductor plate 127 has a substantially ¼ length of the wavelength corresponding to the operating frequency of the antenna 114.

Thus, the communication apparatus 100 can suppress the electric current leaking from the antenna 114 flowing in the electrode by the conductor plate 127, thereby preventing deterioration in communication characteristics in the communication part 111. In addition, the area of the electrode 128 can be increased, and diversity performance in the communication part 121 can be attained.

Second Embodiment

Figure 5:
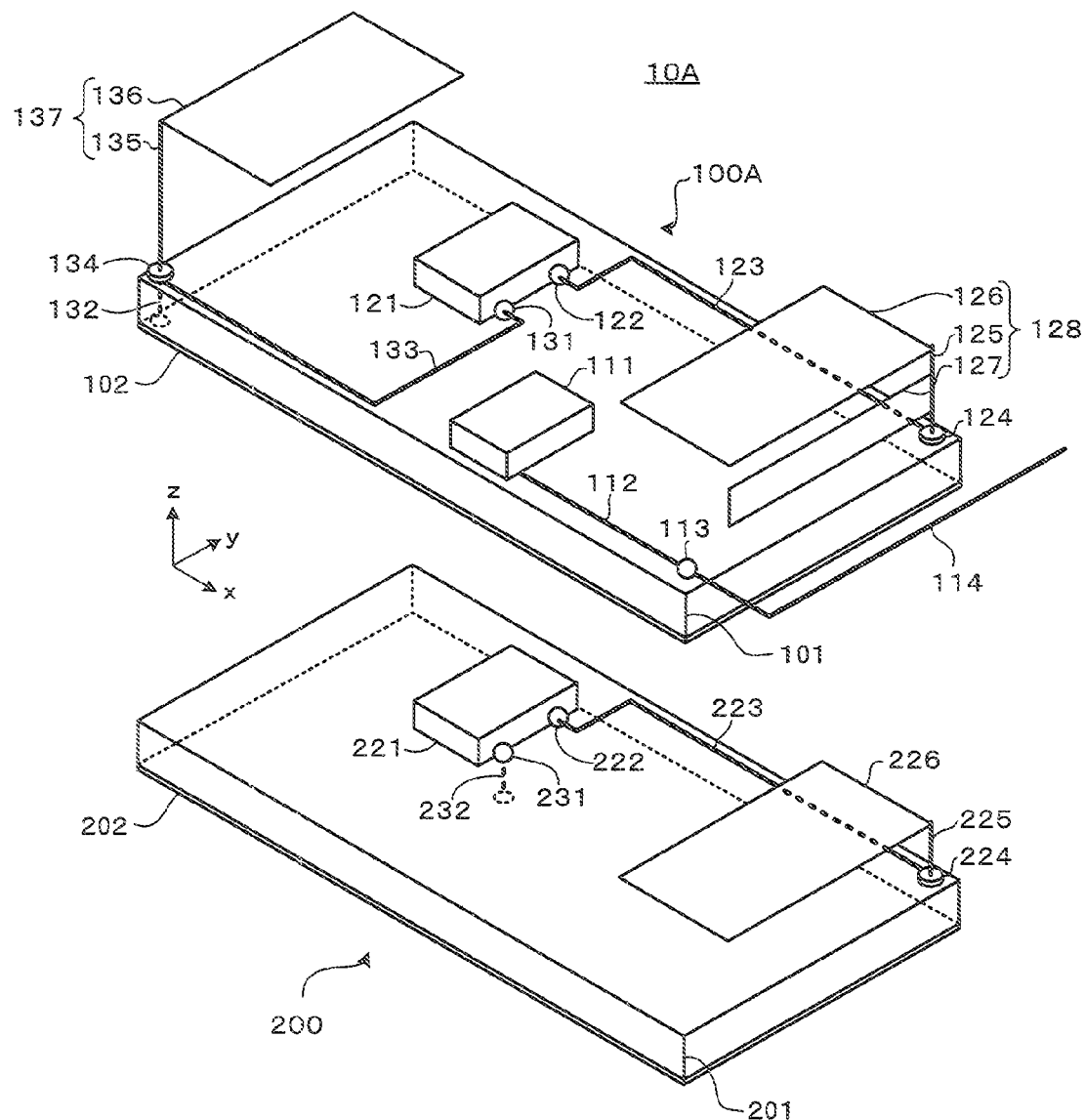
FIG. 5 is a schematic view representing a communication system 10A according to a second embodiment of the present invention.

FIG. 5 is a schematic view representing a communication system 10A according to a second embodiment of the present invention. The communication system 10A has communication apparatuses 100A, 200 communicating with each other.

The communication apparatus 100A is made by adding a terminal 131, a signal line 133, a terminal 134, a signal line 135, and a conductor plate 136 to the communication apparatus 100.

To the terminal 134 mounted on the substrate 101, an electrode 137 formed of the signal line 135 and the conductor plate 136 is connected. Then, the terminal 134 is connected to the terminal 131 by the signal line 133 mounted on the substrate. The terminal 134 is also connected to the ground part 102 by a through hole 132.

The electrodes 128, 137 couple to the electrodes 226, 202, respectively, of the communication apparatus 200. Thus, the potential difference between the two electrodes disposed in one of the communication apparatuses 100, 200 can be transmitted to the two electrodes disposed in the other communication apparatus.

As described above, in communication by the communication part 121, the potential difference between the electrodes 128, 137 is transmitted. When the distance between the electrodes 128, 137 is small, coupling occurs between the electrodes 128, 137. As a result, the potential difference between the electrodes 128, 137 becomes small, and the communication characteristics deteriorate. Accordingly, the electrodes 128, 137 are disposed on opposite longitudinal sides of the substrate 101 (the distance between the centers of the respective sides is largest). The distance between the electrodes 128, 137 is made large, and thus coupling and decrease in potential difference between the electrodes 128, 137 can be suppressed.

Further, the electrode 137 and the ground part 102 are connected to form an electrode entirely, thereby allowing increase in electrode area.

In this embodiment, the electrode 128 is connected to the terminal 122 as the input/output signal terminal, and the electrode 137 is connected to the terminal 131 as the reference potential terminal. On the other hand, there is no problem when the connection terminals of the electrodes 128, 137 are replaced. When the electrode 128 is connected to the terminal 131 as the reference potential terminal, the terminal 134 is not connected to the ground part 102, and the terminal 124 is connected to the ground part 102 via the through hole. Consequently, an effective area of the electrode 128 increases.

Third Embodiment

Figure 6:
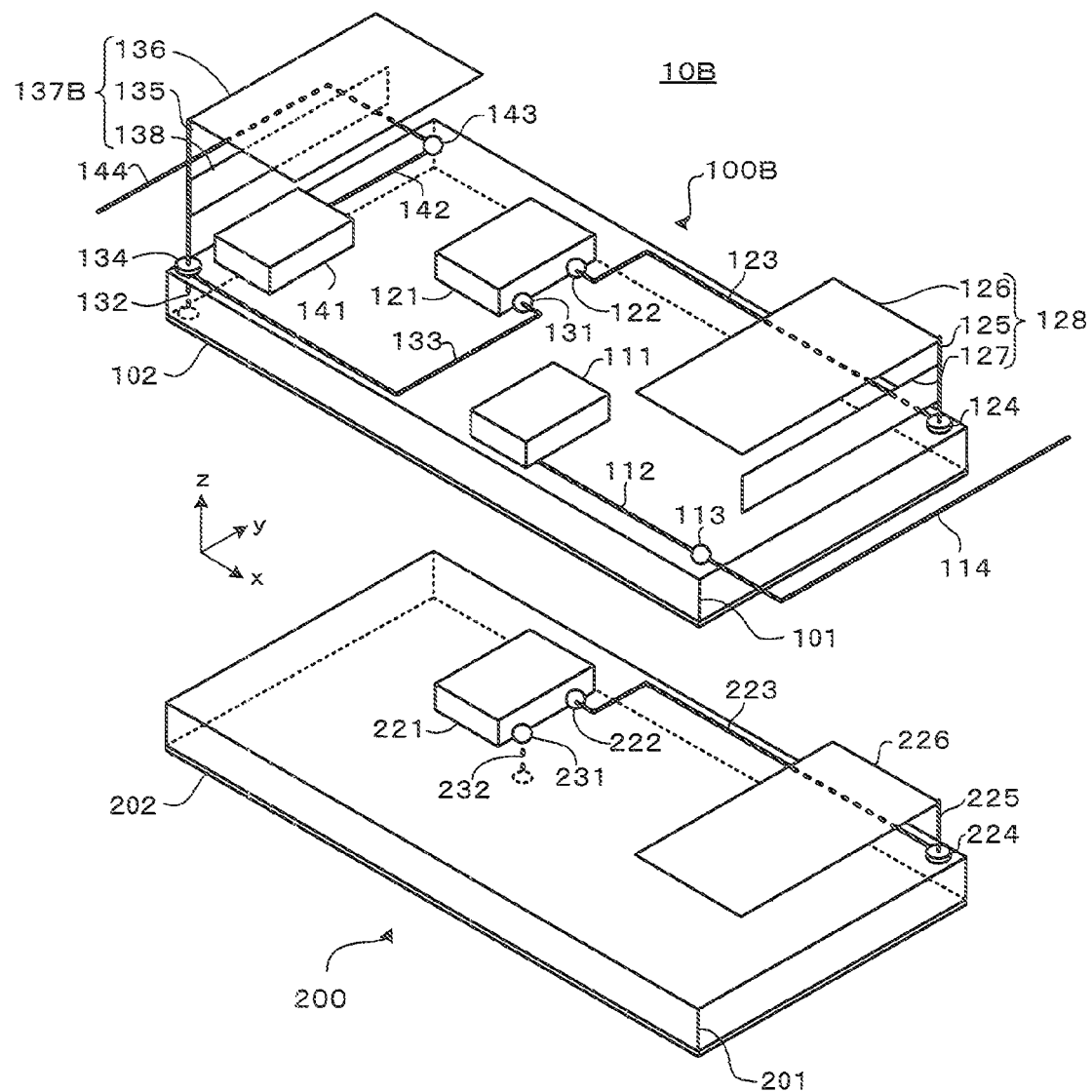
FIG. 6 is a schematic view representing a communication system 10B according to a third embodiment of the present invention.

FIG. 6 is a schematic view representing a communication system 10B according to a third embodiment of the present invention. The communication system 10B has communication apparatuses 100B, 200 communicating with each other.

The communication apparatus 100B is made by adding a communication part 141, a signal line 142, a power supply part 143, an antenna 144, and a conductor plate 138 to the communication apparatus 100. The power supply part 143 is provided in an end part of the substrate 101 on which the terminal 134, to which the conductor plate 136 is connected, is mounted, and the antenna 144 is connected to the power supply part 143. The power supply part 143 is connected to the communication part 141 mounted on the substrate 101 by the signal line 142. The conductor plate 138 having a ¼ length of the wavelength of the operating frequency of the antenna 144 is then connected onto the signal line 135.

By thus connecting the conductor plate 138 onto the signal line 135, it is possible to prevent deterioration in performance of the antenna 144 connected in the same end portion in which the electrode is connected.

Fourth Embodiment

Figure 7:
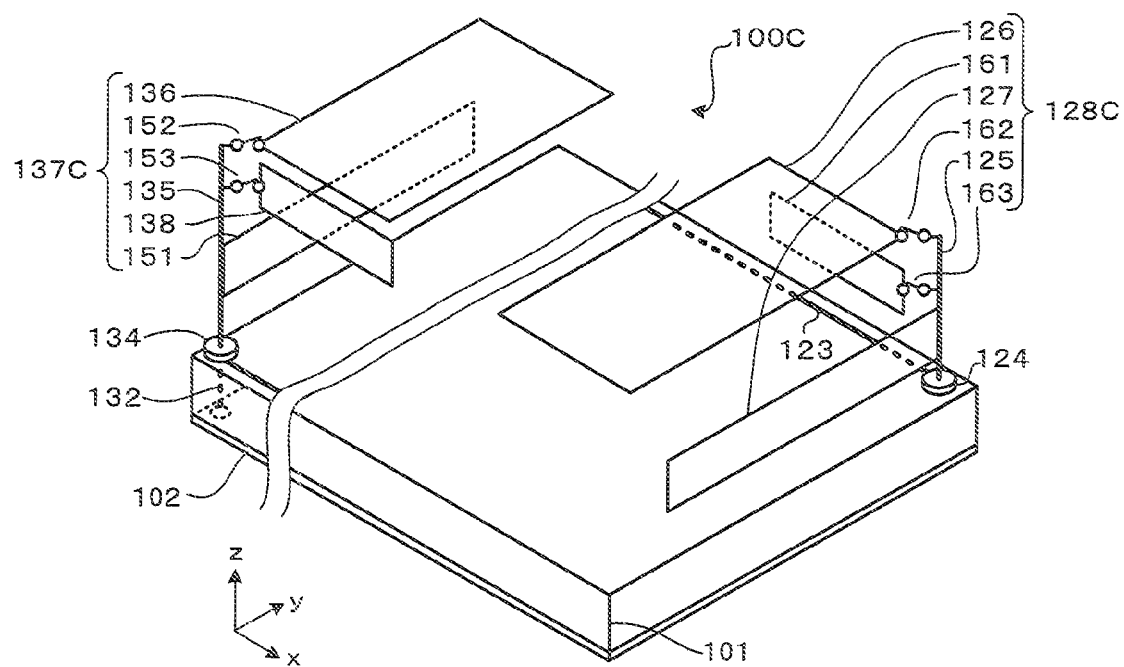
FIG. 7 is a schematic view representing a communication apparatus 100C according to a fourth embodiment of the present invention.

FIG. 7 is a schematic view representing a communication apparatus 100C of a communication system 10C according to a fourth embodiment of the present invention. The communication system 100 has communication apparatuses 100C, 200 communicating with each other. Note that only part of the communication apparatus 100C is illustrated, and the communication apparatus 200 is omitted from illustration.

The communication apparatus 100C is made by adding a conductor plate 161, switches 162, 163, a conductor plate 151, and switches 152, 153 to the communication apparatus 100. An electrode 128C is formed of a signal line 125, conductor plates 126, 127, 161, and switches 162, 163. Further, an electrode 137C is formed of a signal line 135, conductor plates 136, 138, 151, and switches 152, 153.

The conductor plates 126 and 161 are connected to the signal line 125 by the switches 162 and 163, respectively. In the electrode 137C, the conductor plates 136 and 138 are connected to the signal line 135 by the switches 152 and 153, respectively. The conductor plates 126 and 161 can be in a state of, for example, being fixed to the case of a communication terminal apparatus. The switches 162, 163, 152, 153 are controllable by the communication part 121.

In the communication part 121 to which the electrodes 128C, 137C are connected, the potential difference between the electrodes 128C, 137C is measured when a signal from the communication apparatus 200 is received. Based on the result thereof, connection states of the switches 162, 163, 152, 153 and the conductor plates 126, 161, 136, 138 are controlled so that the potential difference between the electrodes 1280, 1370 becomes maximum. In this manner, it is possible to maximize transmission power and reception power. In addition, in this embodiment, although two of the conductor plates are connected by the switches in both the electrodes 128C, 137C, the number of connected conductor plates may be changed depending on the structure.

Fifth Embodiment

Figure 8:
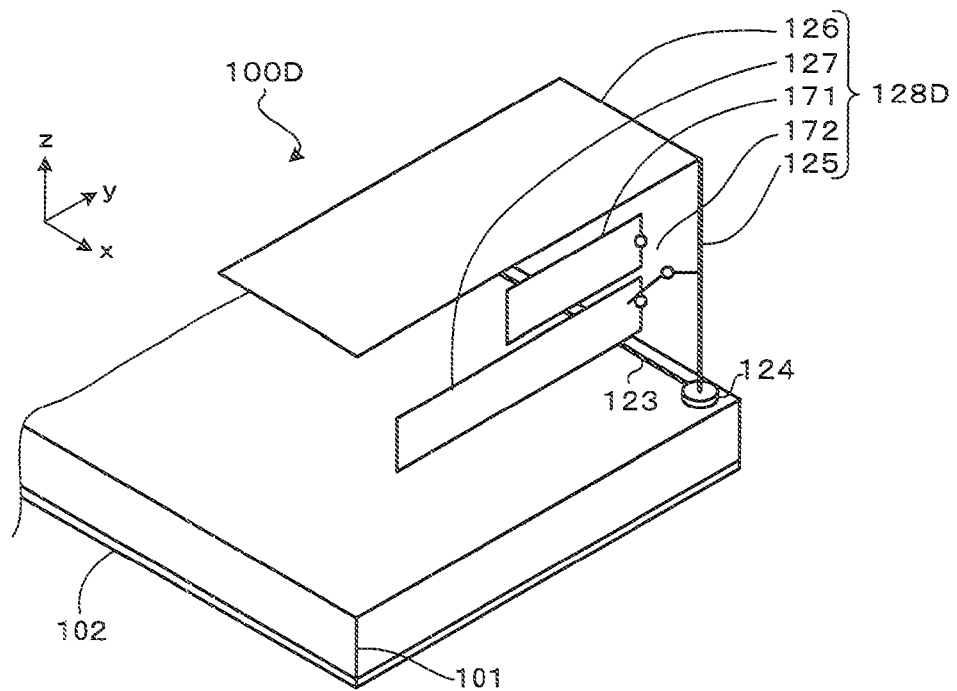
FIG. 8 is a schematic view representing a communication apparatus 100D according to a fifth embodiment of the present invention.

FIG. 8 is a schematic view representing a communication apparatus 100D of a communication system 10D according to a fifth embodiment of the present invention. The communication system 10D has communication apparatuses 100D, 200 communicating with each other. Note that only part of the communication apparatus 100D is illustrated, and the communication apparatus 200 is omitted from illustration.

The communication apparatus 100D is made by adding a conductor plate 171 and a switch 172 to the communication apparatus 100.

An electrode 128C is formed of a signal line 125 and three conductor plates 126, 127, 171, and a switch 172. One of the conductor plates 127 and 171 is connected by the switch 172 to the signal line 125. The switch 172 is connected to the communication part 111 by a not-illustrated control line and controlled thereby.

It is possible that the antenna 114 is an antenna with a characteristic having a wide band or plural resonant frequencies, and the communication part 111 performs communication by switching among the plural frequencies. In this case, preferably, the length of the conductor plate 127 is changed each time the frequencies are switched. Here, it is difficult to change the length of the conductor plate 127 which is disposed once. Accordingly, the conductor plates 127, 171 corresponding to the frequencies used in the communication part 111 are disposed in advance. When the communication part 111 performs communication, the control signal corresponding to the frequency used is transmitted to the switch 172 via a control line. As a result, the switch 172 connects the conductor plate 127, 171 corresponding to the control signal to the signal line 125. In this manner, the electrode 128 can prevent deterioration in antenna performance at the frequency used by the communication part 111 even when the antenna 114 is an antenna with a characteristic having a wide band or plural resonant frequencies.

Although not illustrated, a conductor plate which is not selected and thus is in a state of being not connected to the signal line 125 may be connected to the conductor plate 126 by a switch. When the conductor plate which is not selected is connected to the conductor plate 126, an effect of an increased electrode area can be obtained.

In this embodiment, the conductor plates 127 and 171 are disposed within the same face. In this point, as long as they are connected between the conductor plate 126 and the substrate 101 on the signal line 125, the conductor plates 127 and 171 need not be disposed within the same face.

Further, the conductor plate 171 and the switch 172 may be added to the communication apparatus 100B according to the third embodiment. Here, it is conceivable that the antenna 144 is likewise an antenna with a characteristic having a wide band or plural resonant frequencies, and the communication part 141 performs communication by switching among plural frequencies. In this case, the electrode 137B may be structured similarly to the electrode 128D of this embodiment, thereby switching and using the conductor plate 138 and another electrode.

Sixth Embodiment

Figure 9:
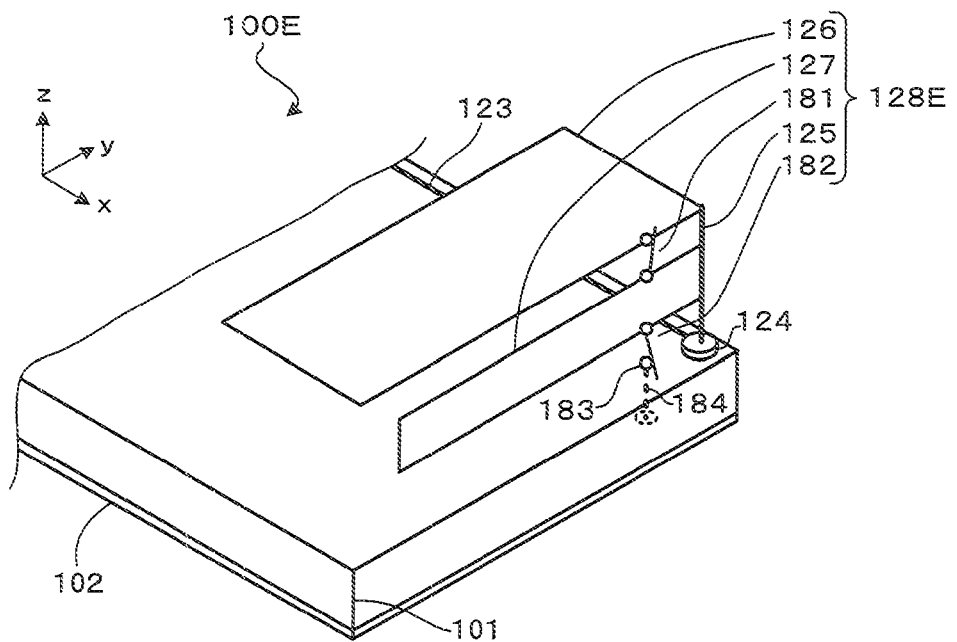
FIG. 9 is a schematic view representing a communication apparatus 100E according to a sixth embodiment of the present invention.

FIG. 9 is a schematic view representing a communication apparatus 100E of a communication system 10E according to a sixth embodiment of the present invention. The communication system 10E has communication apparatuses 100E, 200 communicating with each other. Note that only part of the communication apparatus 100E is illustrated, and the communication apparatus 200 is omitted from illustration.

The communication apparatus 100E is made by adding switches 181, 182 to the communication apparatus 100.

An electrode 128E is formed of a signal line 125, conductor plates 126, 127, and switches 181, 182. The conductor plate 127 is connected to the conductor plate 126 and a terminal 183 on the substrate 101 by the switches 181 and 182, respectively. The terminal 183 on the substrate 101 is connected to the ground part 102 by a through hole 184. The switches 181, 182 are connected to the communication part 111 by not-illustrated control lines and controlled thereby.

By thus switching connection states of the conductor plate 127 to the conductor plate 126 and the ground part 102 by the switches 181, 182, an electrical length of the conductor plate 127 can be changed. Thus, deterioration in antenna performance at the frequency used by the communication part 111 can be prevented even when the antenna 114 is an antenna with a characteristic having a wide band or plural resonant frequencies.

Further, the switches 181, 182 may be added to the communication apparatus 100B according to the third embodiment. Here, it is conceivable that the antenna 144 is likewise an antenna with a characteristic having a wide band or plural resonant frequencies, and the communication part 141 performs communication by switching among plural frequencies. In this case, the electrode 137B may be structured similarly to the electrode 128E of this embodiment, thereby switching and using the conductor plate 138 and another electrode.

Seventh Embodiment

Figure 10:
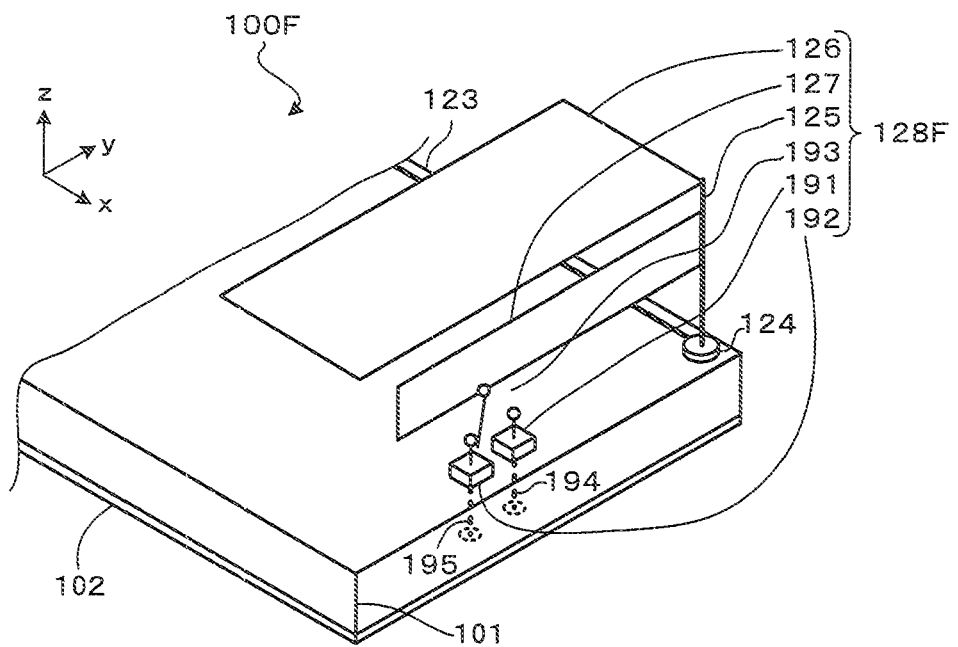
FIG. 10 is a schematic view representing a communication apparatus 100F according to a seventh embodiment of the present invention.

FIG. 10 is a schematic view representing a communication apparatus 100F of a communication system 10F according to a seventh embodiment of the present invention. The communication system 10F has communication apparatuses 100F, 200 communicating with each other. Note that only part of the communication apparatus 100F is illustrated, and the communication apparatus 200 is omitted from illustration.

The communication apparatus 100F is made by adding capacitors 191, 192 and a switch 193 to the communication apparatus 100.

The capacitors 191 and 192 are disposed on the substrate 101 below the conductor plate 127. The capacitors 191 and 192 are connected to the conductor plate 127 by the switch 193. The capacitors 191 and 192 are connected to the ground part 102 by through holes 194, 195. The switch 193 is connected to the communication part 111 by a not-illustrated control line and controlled thereby.

When the communication part 111 performs communication, a control signal corresponding to the frequency used is transmitted to the switch 193 via the control line. As a result, in response to the control signal, the switch 193 turns to a state of connecting to one of the capacitors 191 and 192 or connecting to neither. In this manner, the conductor plate 127 can be changed to an electrical length corresponding to the frequency used by the communication part 111. That is, deterioration in antenna performance can be prevented even when the antenna 114 is an antenna with a characteristic having a wide band or plural resonant frequencies.

The number of capacitors is changed corresponding to the frequency used in the communication part 111, and may be three or more.

Figure 11:
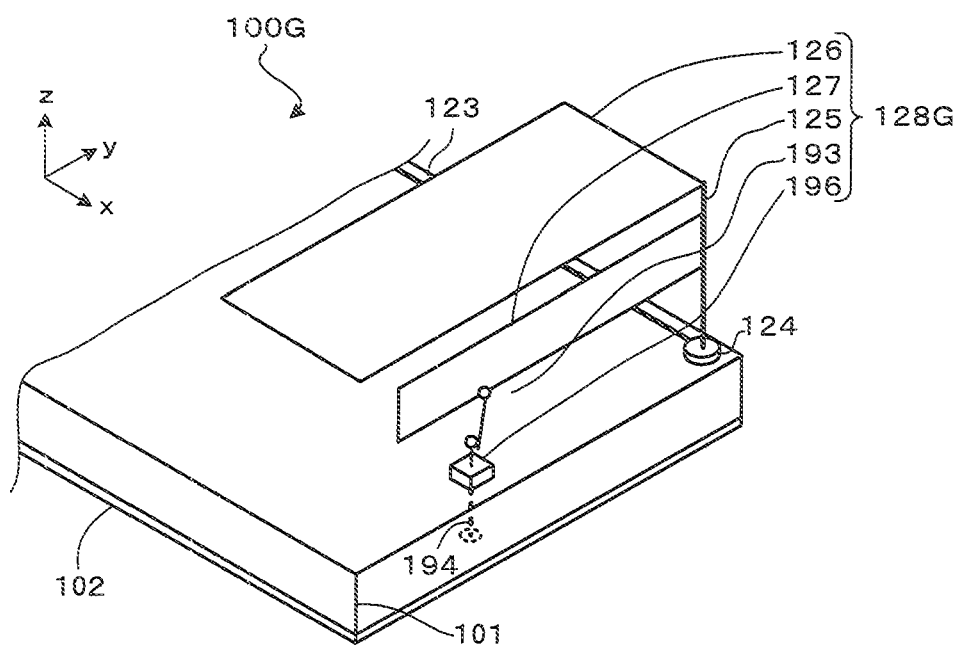
FIG. 11 is a schematic view representing a communication apparatus 100G according to the seventh embodiment of the present invention.

Further, it is also possible to use a variable capacitance element 195 as illustrated in FIG. 11. The variable capacitance element 195 is connected to the communication part 111 by a control line. When the electrical length of the conductor plate 127 is changed corresponding to the frequency used by the communication part 111, a control signal corresponding to the frequency used by the communication part 111 is sent from the communication part 111 to each of the switch 193 and the variable capacitance element 195 via the control lines. Then, the switch 193 turns to a state that the conductor plate 127 and the variable capacitance element 195 are connected, and the variable capacitance element 195 has a capacitance value corresponding to the control signal. Thus, the conductor plate 127 has an electrical length corresponding to the frequency used by the communication part 111. That is, deterioration in antenna performance at the frequency used by the communication part 111 can be prevented even when the antenna 114 is an antenna with a characteristic having a wide band or plural resonant frequencies.

Further, the capacitors 191, 192 and the switch 193 may be added to the communication apparatus 100B according to the third embodiment. Here, it is conceivable that the antenna 144 is likewise an antenna with a characteristic having a wide band or plural resonant frequencies, and the communication part 141 performs communication by switching among plural frequencies. In this case, the electrode 137B may be structured similarly to the electrode 128F of this embodiment, thereby switching and using presence/absence of connections of the capacitors, or the like.

Other Embodiments

The embodiments described herein are not limited to the above-described embodiments and can be expanded and modified. Such expanded or modified embodiments are also included in the technical scope.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
   a substrate;
   an antenna disposed on the substrate;
   a first communication part transmitting or receiving a signal at a predetermined frequency via the antenna;
   a first conductor plate;
   a terminal disposed on the substrate and connected to the first conductor plate by a conductor line;
   a second communication part disposed on the substrate, connected electrically to the terminal, and communicating with a communication partner via the first conductor plate; and
   a second conductor plate connected electrically to the conductor line and having a length of substantially ¼ of the wavelength of the predetermined frequency.

2. The communication apparatus according to claim 1, wherein the first and the second conductor plates are substantially orthogonal to each other.

3. The communication apparatus according to claim 2, further comprising a third conductor plate disposed on the substrate and connected electrically to the second communication part,
   wherein the second communication part has a signal terminal and a reference potential terminal; and
   wherein the terminal is connected to the signal terminal and the third conductor plate is connected to the reference potential terminal.

4. The communication apparatus according to claim 3, wherein the substrate is rectangular; and
   wherein the first and the second conductor plates are disposed in a longitudinal direction of the substrate.

5. The communication apparatus according to claim 4, further comprising:
   a first switch switching presence/absence of an electrical connection of the first and the second conductor plate; and
   a second switch switching presence/absence of an electrical connection of the substrate and the second conductor plate.

6. The communication apparatus according to claim 3, further comprising:
   a second antenna disposed on the substrate and disposed closer to the third conductor plate than the antenna;
   a third communication part transmitting or receiving a signal at a predetermined second frequency via the second antenna; and
   a fourth conductor plate connected electrically to the reference potential terminal and having a length of substantially ¼ of the wavelength of the predetermined second frequency.

7. The communication apparatus according to claim 3, further comprising:
   a fifth conductor plate connected electrically to the signal terminal;
   a sixth conductor plate connected electrically to the reference potential terminal;
   a third and a fourth switch switching presence/absence of electrical connections between each of the first and the fifth conductor plate and the signal terminal;
   a fifth and a sixth switch switching presence/absence of electrical connections between each of the third and the sixth conductor plate and the signal terminal; and
   a control part controlling the third to the sixth switch.

8. The communication apparatus according to claim 1, wherein the first communication part communicates by switching the predetermined frequency and the second predetermined frequency; and
   wherein the apparatus further comprises:
   a seventh conductor plate connected electrically to the conductor line and having a length of substantially ¼ of the wavelength of the second predetermined frequency; and
   a seventh switch switching connections of the conductor line and the second and the seventh conductor plate corresponding to the switching of frequency by the first communication part.

9. The communication apparatus according to claim 1, further comprising:
   a capacitor connected to a grand part of the substrate; and
   an eighth switch switching presence/absence of connections of the second conductor plate and the capacitor.

10. The communication apparatus according to claim 9, wherein the capacitor includes a variable capacitor.

* * * * *